United States Patent [19]

Kitajima et al.

[11] Patent Number: 5,352,520
[45] Date of Patent: Oct. 4, 1994

[54] PROPYLENE-ETHYLENE/BUTENE BLOCK COPOLYMER

[75] Inventors: Yoshiyuki Kitajima; Eitaro Asaeda, both of Tokuyama, Japan

[73] Assignee: Tokuyama Corporation, Tokuyama, Japan

[21] Appl. No.: 47,626

[22] Filed: Apr. 15, 1993

Related U.S. Application Data

[63] Continuation of Ser. No. 782,127, Oct. 25, 1991, abandoned.

[30] Foreign Application Priority Data

Oct. 25, 1990 [JP] Japan .................................. 2-285846
Aug. 8, 1991 [JP] Japan .................................. 3-199338

[51] Int. Cl.$^5$ .................................................. C08F 297/08
[52] U.S. Cl. ........................................ 428/402; 525/247; 525/268; 525/270; 525/323
[58] Field of Search ............... 525/323, 247, 268, 270; 428/402

[56] References Cited

U.S. PATENT DOCUMENTS 3,378,606 4/1968 Kontos ................................. 525/319
3,509,056 4/1970 Shepherd ............................. 525/323
4,481,336 11/1984 Fujii et al. ........................... 525/319

FOREIGN PATENT DOCUMENTS 58-104913 6/1983 Japan .
58-162620 9/1983 Japan .
994416 6/1965 United Kingdom ............... 525/323

*Primary Examiner*—Romulo H. Delmendo
*Attorney, Agent, or Firm*—Sherman and Shalloway

[57] ABSTRACT

Disclosed is a propylene-ethylene/butene block copolymer, comprising a polybutene component block-copolymerized with a propylene-ethylene random copolymer component, or with a polypropylene component and a propylene-ethylene random copolymer component, the content of the polybutene component being 0.1 to 10% by weight, the total content of the propylene-ethylene random copolymer component and the polypropylene component being 99.9 to 90% by weight and the content of the polypropylene component being 0 to 30% by weight, wherein the propylene-ethylene random copolymer component is composed of a copolymer comprising 15 to 80 mole % of monomer units based on ethylene and 85 to 20 mole % of monomer units based on propylene, and said block copolymer is a powder having a high molecular weight.

12 Claims, 2 Drawing Sheets

PROPYLENE-ETHYLENE/BUTENE BLOCK COPOLYMER

This application is a continuation of application Ser. No. 07/782,127, filed Oct. 25, 1991, now abandoned.

BACKGROUND OF THE INVENTION

(1) Field of the Invention

The present invention relates to a propylene-ethylene/butene block copolymer having an excellent softness and a high transparency and having no tackiness.

(2) Description of the Related Art

Conventional molded articles formed of an ethylene-propylene rubber (hereinafter referred to as "EPR") are defective in that they have a surface tackiness. EPR prepared by polymerization of ethylene and propylene is an agglomerate body and therefore, the agglomerate body is difficult to handle. As means for overcoming these disadvantages, there has been proposed a method of increasing the molecular weight of EPR.

However, a molded article composed of EPR having a high molecular weight is defective in that the heat resistance, processability and mechanical strength are not sufficient. It is known that this problem can be solved by blending polypropylene into EPR. However, a molded article composed of a mixture of EPR and polypropylene is white or milky white and is inferior in transparency to other resins having an equivalent softness, such as linear low-density polyethylene and soft polyvinyl chloride. Therefore, a mixture of EPR and polypropylene cannot be used for vessels for which transparency is required, such as a sheet, a film and other molded articles.

SUMMARY OF THE INVENTION

It is therefore a primary object of the present invention to provide a material having an excellent transparency while retaining good properties of a mixture of EPR and polypropylene.

As the result of research made with a view to attaining this object, it was found that a propylene-ethylene/-butene block copolymer comprising a propylene-ethylene copolymer component and a polybutene component is a material capable of attaining this object. The present invention has now been completed based on this finding.

More specifically, in accordance with the present invention, there is provided a propylene-ethylene/butene block copolymer, comprising a polybutene component block-copolymerized with a propylene-ethylene random copolymer component, or with a polypropylene component and a propylene-ethylene random copolymer component, the content of the polybutene component being 0.1 to 10% by weight, the total content of the propylene-ethylene random copolymer component and the polypropylene component being 99.9 to 90% by weight and the content of the polypropylene component being 0 to 30% by weight, wherein the propylene-ethylene random copolymer component is composed of a copolymer comprising 15 to 80 mole % of monomer units based on ethylene and 85 to 20 mole % of monomer units based on propylene, and said block copolymer is a powder having a high molecular weight.

DETAILED DESCRIPTION OF THE INVENTION

The propylene-ethylene/butene block copolymer (hereinafter referred to as "P-E/B block copolymer") of the present invention comprises essentially a propylene-ethylene random copolymer component and a polybutene component, and the P-E/B block copolymer of the present invention is represented by X-Y where X represents the propylene-ethylene random copolymer component and Y represents the polybutene component.

In order to further improve properties of the P-E/B block copolymer represented by X-Y, such as the flowability of particles and the tensile strength and heat resistance of the molded article, a polypropylene component (Z) can be further bonded by block polymerization. Namely, the block copolymer can have a structure of X-Z-Y.

Since the P-E/B block copolymer of the present invention comprises essentially a propylene-ethylene random copolymer component and a polybutene component, the block copolymer has satisfactory physical properties. If the polybutene component is replaced by a polypropylene component or a polyethylene component, physical properties of a molded article, such as transparency, became insufficient, and the object of the present invention cannot be attained.

In the P-E/B block copolymer of the present invention, the content of the polybutene component is 0.1 to 10% by weight, the total content of the propylene-ethylene random copolymer component and the polypropylene component is 99.9 to 90% by weight, and the content of the polypropylene component is 0 to 30% by weight.

If the content of the polybutene component exceeds 10% by weight, the bulk density of the P-E/B block copolymer is reduced and no good results are obtained. If the content of the polybutene component is lower than 0.1% by weight, the transparency is lost in a molded article composed of the P-E/B block copolymer and no good results can be obtained. If the polypropylene component is contained, the flowability of the powder of the P-E/B block copolymer of the present invention is improved, and furthermore, the tensile strength and heat resistance of a molded article of the P-E/B block copolymer are enhanced. However, if the content of the polypropylene component exceeds 30% by weight, the softness of the molded article is reduced and the transparency is degraded, and any intended P-E/B block copolymer cannot be obtained.

In the P-E/B block copolymer of the present invention, other α-olefin can be incorporated in a small amount, for example, up to 5 mole %, into the propylene-ethylene random copolymer component, the polybutene component or the polypropylene component, so far as the physical properties of the P-E/B block copolymer of the present invention are not degraded.

In the propylene-ethylene random copolymer component, the content of monomer units based on ethylene is 15 to 80 mole %, preferably 15 to 60 mole %, especially preferably 20 to 50 mole %, and the content of monomer units based on propylene is 85 to 20 mole %, preferably 85 to 40 mole %, especially preferably 80 to 50 mole %.

If the content of monomer units based on ethylene is lower than 15 mole % and the content of monomer units based on propylene exceeds 85 mole %, the softness and impact resistance of the molded article are insufficient and no good results can be obtained. In contrast, if the content of monomer units based on ethylene exceeds 80 mole % and the content of monomer units based on propylene is lower than 20 mole %, the tensile strength and heat resistance are not satisfactory and no good results can be obtained.

The P-E/B block copolymer of the present invention is in the form of a powder. Since the block copolymer has a powdery shape, agglomeration of particles is hardly caused and a good flowability is maintained. On the other hand, if particles are bulky, agglomeration of the particles is caused and the flowability is low, and therefore, no-good results can be obtained.

In order to obtain the powdery P-E/B block copolymer, it is necessary to reduce the content of a low-molecular-weight component. In the elution curve of the P-E/B block copolymer of the present invention, determined by gel permeation chromatography (hereinafter referred to as "GPC"), the proportion of a component having a molecular weight lower than 10,000 is adjusted to lower than 1.0% by weight, preferably lower than 0.5% by weight, whereby the intended powdery state can be maintained. One method of reducing the proportion of the low-molecular-weight component to the P-E/B block copolymer comprises relatively increasing the weight average molecular weight of the P-E/B block copolymer. The weight average molecular weight of the P-E/B block copolymer is at least 600,000, preferably at least 800,000, particularly preferably at least 1,000,000, especially particularly preferably 1,500,000 to 7,000,000, most preferably 1,500,000 to 3,000,000. If the weight average molecular weight of the P-E/B block copolymer is within the said range, the P-E/B block copolymer is readily powdered.

Incidentally, the weight average molecular weight referred to in the instant specification is one determined by gel permeation chromatography (hereinafter referred to as "GPC").

It is sufficient if the P-E/B block copolymer of the present invention is in the form of a powder, and the average particle diameter ($D_{50}$) is not particularly critical, but it is preferred that $D_{50}$ be 100 to 1,000 μm, especially 100 to 800 μm. The particle size distribution of the P-E/B block copolymer of the present invention is not particularly critical, but the particle size distribution is preferably relatively narrow. Namely, it is preferred that the content of particles having a size-smaller than 100 μm be lower than 1% by weight and the content of particles having a size of at least 8,000 μm, especially at least 1,000 μm, be lower than 1% by weight.

The bulk density of the P-E/B block copolymer is preferably at least 0.35 g/cm$^3$, especially preferably 0.35 to 0.50 g/cm$^3$.

The angle of repose of the P-E/B block copolymer of the present invention is not particularly critical, but the angle of repose is preferably smaller than 40°.

In the case where the P-E/B block copolymer of the present invention is once molten and is then pelletized, the flowability of the melt is drastically reduced and molding of the pellet is difficult. This behavior is not observed in conventional EPR, that is, EPR having a molecular weight of about 200,000 to about 300,000. As regards the solubility of the P-E/B block copolymer of the present invention in solvents, when 1 g of the block copolymer is dissolved in 100 ml of boiling decalin, at least 80% by weight, especially at least 90% by weight, or particularly almost 100% by weight, as shown in examples given hereinafter, of the entire powder is dissolved. However, if it is intended to dissolve in 100 ml of boiling decalin the powder recovered from the above decalin solution of the P-E/B block copolymer by evaporation of decalin or cooling of the solution, the block copolymer is dissolved only in an amount of up to 40% by weight. Furthermore, the powder of the P-E/B block copolymer recovered by cooling of the solution has a very low flowability at melting, like the above-mentioned pellet.

The reason why the P-E/B block copolymer of the present invention shows the above-mentioned behavior has not been elucidated. However, the present inventors construe that in the powder obtained by melting the P-E/B block copolymer by heating or dissolving the block copolymer in a solvent and coagulating the melt or subjecting the solution to precipitation, molecule chains of the P-E/B block copolymer are entangled with one another and the powder comes to have a structure resembling the crosslinked structure. Accordingly, it is considered that it is difficult to melt the above-mentioned powder by heating again or dissolving the powder in the solvent again.

Formation of the P-E/B block copolymer of the present invention can be confirmed, for example, according to the following method. When the $^{13}$C-nuclear magnetic resonance (hereinafter referred to as "NMR") spectrum of the P-E/B block copolymer of the present invention is measured, peaks are observed in the vicinity of 11 ppm, 35 ppm and 40.5 ppm. The peak in the vicinity of 11 ppm is attributed to the carbon $C^1$ of butene monomer units represented by the following formula (i):

The peak in the vicinity of 35 ppm is attributed to the carbon $C^2$ in the above formula (i), and the peak in the vicinity of 40.5 ppm is attributed to the carbon $c^3$ in the above formula (i).

In the $^{13}$C-NMR spectrum, in addition to the above-mentioned peaks, there are observed peaks in the vicinity of 45.5 to 47.5 ppm, 37 to 39 ppm, 33 to 34 ppm and 24.5 to 25.5 ppm. The peak in the vicinity of 45.5 to 47.5 ppm is attributed to the carbon $C^1$ of the propylene-ethylene copolymer portion represented by the following formula (ii):

The peak in the vicinity of 37 to 39 ppm is attributed to the carbon $C^2$ in the above formula (ii), and the peak in the vicinity of 33 to 34 ppm is attributed to the carbon $C^3$ in the above formula (ii). This peak appears when the ethylene monomer units (E) and the propylene monomer units (P) are connected to form EPE. The peak in the vicinity of 24.5 to 25.5 ppm is attributed to the carbon $C^4$ in the formula (ii). This peak appears when the units E and the units P are connected to form PEP. Accordingly, if both the peak in the vicinity of 33 to 34 ppm and the peak in the vicinity of 24.5 to 25.5 ppm are observed, it is confirmed that ethylene and propylene are random-copolymerized.

From $^{13}$C-NMR spectrum of the P-E/B block copolymer of the present invention, the proportions of the propylene-ethylene random copolymer component and polybutene component and the proportions of monomer units based on ethylene and monomer units based on propylene in the propylene-ethylene random copolymer component can be calculated.

In the case where the P-E/B block copolymer of the present invention contains the polypropylene component, if the block copolymer is subjected to the differential scanning calorimetry (DSC), a peak appears in a range of 155° to 165° C. This temperature is melting point Tm (° C.) based on the polypropylene component in the P-E/B block copolymer. The melting heat at this melting point is determined by the content of the polypropylene component in the P-E/B block copolymer, and if the polypropylene component is contained in an amount of up to 30% by weight, the melting heat is smaller than 30 mJ/mg.

The process for the preparation of the P-E/B block copolymer of the present invention is not particularly critical. For example, there is preferably adopted a process in which propylene or 1-butene is preliminarily polymerized in the presence of (A) a titanium compound and (B) an organic aluminum compound, optionally together with (C) an organic silicon compound represented by the following general formula:

$$R_nSi(OR')_{4-n} \qquad [I]$$

wherein R represents an alkyl group having 1 to 6 carbon atoms, an alkenyl group having 2 to 7 carbon atoms, a phenyl group, a cyclohexyl group or norbornyl group, R' represents an alkyl group having 1 to 6 carbon atoms, and n is an integer of from 1 to 3, or (D) an iodine compound represented by the following general formula:

$$R''-I \qquad [II]$$

wherein R" represents an iodine atom or an alkyl group having 1 to 7 carbon atoms or a phenyl group, so that the amount of the polymer is 0.1 to 500 grams per gram of the titanium component, thereby to obtain a catalyst-containing prepolymer, and in the presence of the catalyst-containing prepolymer, polymerization of 1-butene, polymerization of propylene if necessary, and random polymerization of a mixture of propylene and ethylene are conducted in sequence to obtain a powder having a high molecular weight.

This preparation process is characterized in that preliminary polymerization is carried out in the presence of a specific catalyst, and polymerization of 1-butene, polymerization of propylene if necessary and propylene-ethylene random copolymerization are carried out in sequence. If the preliminary polymerization is not carried out, the intended P-E/B block copolymer of the present invention can hardly be obtained. Furthermore, if the order of the polymerization of 1-butene and the random copolymerization of propylene and ethylene is reversed, the intended powder can hardly be obtained. This will be readily understood if examples and comparative examples given hereinafter are compared.

In order to obtain the P-E/B block copolymer as a powder having a high transparency and a high bulk specific gravity, it is an important requirement that the content of a formed low-molecular-weight polymer, for example, a polymer having a molecular weight lower than 10,000, should be controlled below 1.0% by weight. Accordingly, the P-E/B block copolymer of the present invention generally has a molecular weight higher than the molecular weight (200,000 to 300,000) of an ordinary ethylene-propylene rubber and the molecular weight (100,000 to 500,000) of ordinary crystalline polypropylene. Preferably, the weight average molecular weight of the P-E/B block copolymer is at least 600,000, preferably at least 800,000, particularly preferably 1,500,000 to 7,000,000, most preferably 1,500,000 to 3,000,000.

In order to attain this molecular weight, the conditions of the preliminary polymerization and main polymerization, the combination of catalyst components and the polymerization sequence should preferably be selected as described below.

Known titanium compounds used for polymerization of olefins can be used as the titanium compound (A) in the preliminary polymerization for the production of the P-E/B block copolymer. Titanium compounds comprising titanium, magnesium and a halogen and having a high catalyst activity are preferably used. Such titanium compounds having a high catalyst activity are formed by supporting a-titanium halide, especially titanium tetrachloride, on various magnesium compounds. Known processes can be adopted without any limitation for the production of these catalysts. For example, there can be adopted processes disclosed in Japanese Unexamined Patent Publication No. 56-155206, No. 56-136806, No. 57-34103, No. 58-8706, No. 58-83006, No. 58-138708, No. 58-183709, No. 59-206408, No. 59-219311, No. 60-81208, No. 60-81209, No. 60-186508, No. 60-192708, No. 61-211309, No. 61-271304, No. 62-15209, No. 62-11706, No. 62-72702 and 62-104810. More specifically, there can be adopted a process in which titanium tetrachloride is copulverized with a magnesium compound such as magnesium chloride, a process in which a titanium halide is copulverized with a magnesium compound in the presence of an electron donor such as an alcohol, an ether, an ester ketone or an aldehyde, and a process in which a titanium halide is contacted with a magnesium compound and an electron donor in a solvent.

Instead of the above-mentioned supported catalysts, there can used α-, β-, γ- and δ-titanium trichlorides. Processes disclosed in Japanese Unexamined Patent Publication No. 47-34478, No. 50-126590, No. 50-114394, No. 50-93888, No. 50-123091, No. 50-74594, No. 50-104191, No. 50-98489, No. 51-136625, No. 52-30888, No. and No. 52-35283 are preferably adopted.

In the case where the titanium compound is used as the supported catalyst, the titanium compound is used in combination with an organic aluminum compound and an organic silicon compound, optionally together with an iodine compound as described below. In the case where α-, β-, γ- or δ-titanium trichloride is used, the titanium trichloride is used in combination with an organic aluminum compound, if necessary together with an electron doner. Known organic aluminum compounds used for polymerization of olefins can be used as the organic aluminum compound (B) without any limitation. For example, there can be mentioned trialkyl aluminum compounds such as trimethyl aluminum, triethyl aluminum, tri-n-propyl aluminum, tri-n-butyl aluminum, tri-i-butyl aluminum, tri-n-hexyl aluminum, tri-n-octyl aluminum and tri-n-decyl aluminum, diethyl aluminum monochlorides such as diethyl aluminum monochloride and diethyl aluminum monobromide, and alkyl aluminum halides such as methyl aluminum sesquichloride, ethyl aluminum sesquichloride and ethyl aluminum dichloride. Furthermore, alkoxy aluminum compounds such as monoethoxydiethyl aluminum and diethoxymonoethyl aluminum can be used. Triethyl aluminum is especially preferably used.

Any of compounds represented by the general formula [I] can be used as the organic silicon compound (C). Alkyl groups having 1 to 6 carbon atoms, such as a methyl group, an ethyl group, a propyl group, a butyl group, a heptyl group and a hexyl group, alkenyl groups having 2 to 7 carbon atoms, such as vinyl group, an allyl group, a butylene group, a pentene group and a hexene group, a phenyl group, a cyclohexyl group and a norbornenyl group are preferably used as R in the general formula [I]. Alkyl groups having 1 to 6 carbon atoms, such as mentioned above, are used as R' in the general formula [I]. These groups may be substituted, for example, with an alkyl group. An alkyl group having 1 to 4 carbon atoms is preferably used as this alkyl group.

As examples of the silicon compound preferably used in the present invention, there can be mentioned trimethylmethoxysilane, trimethylethoxysilane, diemthyldimethoxysilane, dimethyldiethoxysilane, diphenyldimethoxysilane, methylphenyldimethoxysilane, methylphenyldimethoxysilane, diphenyldiethoxysilane, ethyltrimethoxysilane, methyltrimethoxysilane, vinyltrimethoxysilane, phenyltrimethoxysilane, methyltriethoxysilane, ethyltriethoxysilane, vinyltriethoxysilane, allyltriethoxysilane, butyltriethoxysilane, phenyltriethoxysilane, cyclohexyltriethoxysilane and 6-triethoxysilyl-2-norbornene.

In the present invention, if an iodine compound (D) represented by the following formula [II]:

-I wherein R" represents an iodine atom, an alkyl group having 1 to 6 carbon atoms, or a phenyl group, is used in addition to the titanium compound (A), the organic aluminum compound (B) and the organic silicon compound (C), the bulk specific gravity of particles of the P-E/B block copolymer increases, and the content of the low-molecular-weight component, for example, a polymer having a molecular weight lower than 10,000, is drastically reduced in the P-E/B block copolymer and hence, a high flowability is given to the block copolymer.

Alkyl groups as mentioned above with respect to R in the general formula [I] can be used as the alkyl group R" in the general formula [II], and the phenyl group may be a substituted phenyl group and an alkyl-substituted phenyl group is preferably used.

For example, iodine, methyl iodide, ethyl iodide, propyl iodide, butyl iodide, iodobenzene and p-iodotoluene are preferably used as the iodine compound. Methyl iodide and ethyl iodide are especially preferably used.

The amounts used of the compounds (A) and (B) and the compounds (C) and (D) optionally used depend on the kind of the catalyst, the conditions of the preliminary polymerization, the conditions of the polymerization of 1-butene and the conditions of the random polymerization of propylene and ethylene. Accordingly, optimum amounts are appropriately determined in advance according to the respective conditions. In general, the amounts are preferably determined, for example, according to the following procedures.

Incidentally, the preliminary polymerization is not always conducted once, but good results are often obtained when the preliminary polymerization is conducted a plurality of times. Accordingly, the proportions of the respective catalyst components described below are those for one preliminary polymerization.

The amount used of the organic aluminum compound (B) is such that the Al/Ti molar ratio is 1 to 100, preferably 2 to 20, and the amount used of the organic silicon compound (C) optionally used is such that the Si/Ti molar ratio is 0.1 to 100, preferably 0.5 to 50. The amount of the iodine compound (D) optionally used is such that the I/Ti molar ratio is 0.1 to 100, preferably 0.5 to 50.

In the present invention, the above-mentioned preliminary polymerization is an important factor for controlling the particulate shape and physical properties of the obtained P-E/B block copolymer. In order to obtain a powdery P-E/B block copolymer having a good flowability and a high transparency, it is often preferred that the preliminary polymerization be carried out in a plurality of stages, for example, 2 to 5 stages. In this case, each polymerization can be carried out by adding the respective components in the above-mentioned ratios. Alternatively, there can be adopted a method in which the respective components are added in necessary amounts at the first preliminary polymerization and the second preliminary polymerization and subsequent preliminary polymerization are conducted without adding the catalyst component, or a method in which the second preliminary polymerization and subsequent preliminary polymerization are conducted with and without addition of the catalyst component. With respect to the organic silicon compound (C) as the catalyst, if different kinds of organic silicon compounds are used for the respective preliminary polymerizations, formation of the low-molecular-weight component in the obtained P-E/B block copolymer is effectively controlled, though the reason is not elucidated. In order to obtain a P-E/B block polymer having a reduced content of the low-molecular-weight component, it is preferred that a compound of the general formula [I] in which at least one of R and R' is a bulky hydrocarbon group such as a phenyl group, a cyclohexyl group or a norbornyl group be used as the organic silicon compound (C). The order of use of organic silicon compounds for the respective preliminary polymerizations is not particularly critical.

The amount of the polymer obtained by the preliminary polymerization in the presence of the catalyst component depends on the number of stages of the preliminary polymerization and the preliminary polymerization conditions, but this amount is 0.1 to 500 g, preferably 1 to 100 g, per gram of the Ti component, and the amount of the polymer obtained by one preliminary polymerization is 0.1 to 100 g, preferably 2 to 50 g, per gram of the Ti component.

In view of the control of the physical properties of the obtained P-E/B block copolymer, it is preferred that a single monomer of propylene or 1-butene be used as propylene or butene-1 for the preliminary polymerization. However, other olefin such as ethylene, propylene, 1-butene, 1-pentene, 1-hexene or 4-methylpentene-1 may be mixed in an amount having no bad influences on the physical properties of the block copolymer, for example, in amount of up to 5 mole %. Furthermore, hydrogen may be made present at each preliminary polymerization.

Ordinary slurry polymerization is preferably applied to the preliminary polymerization. As the solvent, there can be used saturated aliphatic hydrocarbons and aromatic hydrocarbons such as hexane, heptane, cyclohexane, benzene and toluene, and mixtures of two or more of these hydrocarbons.

Preferably, the preliminary polymerization temperature is $-20°$ to $100°$ C., especially $0°$ to $60°$ C. When the preliminary polymerization is carried out a plurality of times, different temperature conditions can be adopted for the respective preliminary polymerizations. The preliminary polymerization time can be appropriately determined according to the preliminary polymerization temperature and the amount of the polymer formed by the preliminary polymerization temperature. The preliminary polymerization pressure is not particularly critical, and in the case of slurry polymerization, the pressure is generally in the range of from atmospheric pressure to about 5 $kg/cm^2G$. The preliminary polymerization can be conducted batchwise, semibatchwise or in a continuous manner.

After the preliminary polymerization, the formed polymerization mixture can be directly fed to the step of the subsequent polymerization of 1-butene, but it is generally preferred that the polymerization mixture be once washed by the above-mentioned solvent and then subjected to polymerization of 1-butene.

In the present invention, the main polymerization is carried out subsequently to the above-mentioned preliminary polymerization. Namely, in the presence of the catalyst-containing polymer obtained by the preliminary polymerization, polymerization of 1-butene is first carried out, polymerization of propylene is optionally carried out according to need, and finally, random polymerization of propylene and ethylene is carried out.

The same catalyst components and combinations thereof as used for the preliminary polymerization can be used for the main polymerization. The respective catalyst components can be added at the preliminary polymerization, but in general, the catalyst components other than the titanium compound are preferably added afresh at the main polymerization.

Organic aluminum compounds as mentioned above with respect to the preliminary polymerization can be used for the main polymerization, and triethyl aluminum is most preferably used. The amount used of the organic aluminum compound based on the titanium atom in the catalyst-containing prepolymer is such that the Al/Ti molar ratio is from 10 to 1,000, preferably from 50 to 500.

Compounds represented by the above-mentioned general formula [I] can be used as the organic silicon compound without any limitation. The amount of the organic silicon compound used for the main polymerization based on the titanium atom in the catalyst-containing prepolymer is such that the Si/Ti molar ratio is from 0.1 to 1,000, preferably from 0.5 to 500.

The amount of the iodine compound optionally used, based on the titanium atom in the catalyst-containing prepolymer, is such that the Si/Ti molar ratio is from 0.1 to 100, preferably from 0.5 to 50.

According to the main polymerization of the present invention, at first, 1-butene is polymerized in the presence of the catalyst-containing polymer and the catalyst components, that is, the organic aluminum compound, the organic silicon compound and optionally the iodine compound. The polymerization of 1-butene can be carried out in the gas phase, but preferably, 1-butene is polymerized according to slurry polymerization using a solvent as mentioned above. The polymerization temperature is preferably $-20°$ to $100°$ C., especially preferably $0°$ to $60°$ C. The polymerization time is appropriately determined according to the polymerization temperature and the polymerization quantity, but generally, the polymerization time is 15 minutes to 3 hours. The polymerization pressure is not particularly critical, and in case of slurry polymerization, the pressure is selected within a range of from atmospheric pressure to about 5 $kg/cm^2G$.

The polymerization conditions are preferably determined so that the polybutene content in the obtained P-E/B block copolymer is 0.1 to 10% by weight.

The P-E/B block copolymer obtained in the present invention is in the form of a powder having a large bulk density, and most preferably, the 1-butene polymer is composed of a homopolymer. However, copolymerization with other $\alpha$-olefin, such as ethylene, propylene, 3-methylbutene, 4-methyl-1-pentene or 1-hexene, is allowed, so far as bad influences are not imposed on the powdery shape or the properties of the powder. The allowable copolymerization quantity depends on the polymerization conditions, but in general, the content of the other $\alpha$-olefin is preferably up to 5 mole %. The polymerization of 1-butene can be performed in the presence of hydrogen as a molecular weight-adjusting agent according to need.

Subsequently to the polymerization of 1-butene, random copolymerization of propylene and ethylene is carried out directly or through polymerization of propylene optionally conducted. After completion of the polymerization of 1-butene or the polymerization of propylene, unreacted 1-butene is purged and a mixture of propylene and ethylene is supplied instead, and the random copolymerization of propylene and ethylene is carried out. It is often preferred that an electron donor such as an ether compound, an azide compound, an ester compound, an ion-containing compound, a phosphorous-containing compound or an acid anhydride be added afresh as a catalyst component for the random polymerization of propylene and ethylene. In this random polymerization, propylene and ethylene are fed at such a mixing ratio that the content of monomer units based on propylene is 40 to 85 mole %, preferably 40 to 80 mole %, and the content of monomer units based on ethylene is 15 to 60 mole %, preferably 20 to 60 mole %. For this purpose, it is preferred that the mixing ratio of propylene and ethylene be such that the ethylene concentration in the gaseous state is 7 to 50 mole %, especially 10 to 40 mole %.

In order to increase the bulk density of the P-E/B block copolymer, it is preferred that the random polymerization of propylene and ethylene be carried out at a low temperature, for example, at a temperature lower than 80° C., especially 20° to 70° C. According to need, hydrogen can be made present as a molecular weight-adjusting agent. The polymerization can be carried out according to any of the slurry polymerization process using propylene and ethylene per se as the solvent, the gas phase polymerization process and the solution polymerization process. The polymerization can be conducted batchwise, semibatchwise or in a continuous manner. Furthermore, the random polymerization can be conducted in a plurality of stages differing in the polymerization conditions.

The conditions for the random polymerization of propylene and ethylene are not particularly critical, so that the product is obtained in the form of a powder. In general, however, the random polymerization conditions are preferably selected so that the weight average molecular weight is at least 600,000, preferably at least 800,000, particularly preferably 1,500,000 to 7,000,000, most preferably 1,500,000 to 3,000,000, and the content of a low-molecular-weight component, for example, a polymer having a molecular weight lower than 10,000, is lower than 1.0% by weight.

After completion of the main polymerization, the monomers are evaporated from the polymerization mixture to obtain a particulate polymer. If the particulate polymer is washed or subjected to countercurrent washing according to known procedures by using a hydrocarbon having up to 7 carbon atoms as a solvent, the bulk density can be further increased.

In the present invention, polymerization of propylene is carried out according to need. Preferably, this polymerization is carried out after the polymerization of 1-butene. The polymerization of propylene can be conducted under the same conditions as adopted for the random polymerization of propylene and ethylene except that propylene or propylene containing up to 5 mole % of other α-olefin is used as the starting monomer. The polymerization is conducted at 0° to 80° C., preferably 20° to 70° C., and hydrogen is made present as a molecular weight-adjusting agent according to need. Slurry polymerization using propylene per se as the solvent, gas phase polymerization and solution polymerization using a solvent are preferably adopted.

If the polymerization of propylene is carried out intermediately between the polymerization of 1-butene and the random copolymerization of propylene and ethylene, the flowability of the obtained powdery P-E/B block copolymer can be further improved as pointed out hereinbefore, and the tensile strength and heat resistance of a molded article of the P-E/B block copolymer can be increased. Accordingly, this polymerization of propylene is often conducted according to the required properties of the P-E/B block copolymer.

However, if the polypropylene content is too high, the softness of the obtained block copolymer is degraded and the transparency of a molded article is reduced. Therefore, the polypropylene content is preferably controlled to up to 30% by weight.

If 1-butene is used for the preliminary polymerization and the polymerization of propylene is not conducted for the main polymerization, the polypropylene component is not substantially contained in the P-E/B block copolymer, and if propylene is polymerized only by the preliminary polymerization, the content of the polypropylene component in the P-E/B block copolymer is very low, for example, about 0.01 to about 1.0% by weight. In the P-E/B block copolymer, the polypropylene component formed by the preliminary polymerization cannot be distinguished from the polypropylene component formed by the main polymerization, but the attribution of the polypropylene component can be estimated based on the content.

The P-E/B block copolymer of the present invention can be molded into various molded articles having a variety of shapes by injection molding, extrusion molding, press molding and the like.

Preferably, various additives and molding assistants customarily used for polyolefins can be added to the P-E/B block copolymer of the present invention.

The P-E/B block copolymer of the present invention can be formed into particles having a high bulk density even though the ethylene content in the block copolymer is high. The P-E/B block copolymer of the present invention has a high flowability in the powdery state. Accordingly, in the P-E/B block copolymer of the present invention, hanging is not caused in a hopper of a molding machine, and the block copolymer is sufficiently bit by a screw of the molding machine. Therefore, the P-E/B block copolymer of the present invention can be molded by an injection molding method or extrusion molding method adopted for ordinary thermoplastic resins.

The molded article of the P-E/B block copolymer of the present invention has no tackiness and has a high transparency, and therefore, the block copolymer of the present invention can be preferably used in various fields where conventional thermoplastic elastomers are used.

In the field of injection molding, for example, the block copolymer can be used as automobile parts such as bumpers, mat guards and lamp packing, household electric appliances such as packings, and skii shoes, grips and roller skates. In the field of extrusion molding, the block copolymer of the present invention can be used as automobile inner trims, household electric appliances, lining materials, insulating sheets, covering materials for cords and cables, waterproof sheets for civil engineering, water cut-off materials and filling materials.

EXAMPLES

The present invention will now be described in detail with reference to the following examples and comparative examples that by no means limit the scope of the invention.

The measurement methods adopted in these examples are described below.

1) Weight average molecular weight and content of component having molecular weight lower than 10,000

The measurement was conducted according to the gel permeation chromatography (GPC) at 135° C. by using o-dichlorobenzene as a solvent and GPC-150C supplied by Waters Co. The used column was TSK Gel GMH6-HT, supplied by Toso and having a gel size of 10 to 15μ. Calibration curves were prepared by using polystyrenes having molecular weights of 950, 2,900, 10,000, 50,000, 498,000, 2,700,000 and 6,750,000 as standard samples.

2) Proportions of propylene-ethylene random copolymer component, polybutene component and polypropylene component, and contents of monomer units based on ethylene and monomer units based on propylene in propylene-ethylene random copolymer component These proportions and contents were calculated from the $^{13}$C-NMR spectrum chart. More specifically, attributions of peaks were determined according to the process disclosed in "Polymer", volume 29, page 1848 (1988), and the proportions of monomer units based on ethylene and monomer units based on propylene were calculated according to the process disclosed in "Macromolecules", volume 10, page 773 (1977).

Then, the weight ratio of monomer units based on propylene in the propylene-ethylene random copolymer component to the polybutene component is calculated by using the $^{13}$C-NMR spectrum chart. Namely, the weight ratio of monomer units based on propylene to the polybutene component is calculated from the integration intensity ratio of the peak attributed to the methyl carbon in monomer units based on propylene to the peak attributed to the methyl carbon in the polybutene component.

Based on these calculations, the contents of the propylene-ethylene random copolymer component and the polybutene component in the P-E/B block copolymer and the contents of monomer units based on ethylene and monomer units based on propylene in the propylene-ethylene random copolymer component were determined.

3) Bulk density

The bulk density was determined according to JIK K-6721 (1977).

4) Angle of repose

The repose angel was measured according to the method disclosed on page 97 of "Methods of Measuring Properties of Powders" (written by Sohachiro Hayakawa). Namely, into a cylindrical vessel having an inner diameter of 68 mm and a height of 48 mm and having an outlet having a diameter of 10 mm at the center of the bottom, the polymer sample was let to fall from a funnel located above the cylindrical vessel at a height of 50 mm and was filled into the cylindrical vessel. Then, the outlet was opened and the polymer sample kept stationary was caused to flow out, and the inclination angle of the inclined face of the powder layer left in the vessel was measured as the repose angle.

5) Shore A hardness

According to JIS K-6301, a test piece was formed, and the hardness was measured by using an A-type tester.

6) Tensile strength at break and elongation.

A specimen was formed by using dumbbell No. 3 according to JIS K-6301, and the measurement was conducted at a speed of 200 mm/min.

7) Softening temperature

By using TNA supplied by Seiko Denshi, the temperature providing a penetration of 0.1 mm was measured at a temperature-elevating rate of 20° C./min under a load of 49 g.

8) Flexural modulus

A notched test piece having a size of 63.6 mm×12.7 mm×3.1 mm was formed by an injection molding machine (Model J120SAII supplied by Nippon Seikosho), and the measurement was conducted at 23° C. according to ASTM G-790.

9) Izod impact strength

A notched test piece having a size of 63.6 mm×12.7 mm×3.1 mm was formed by an injection molding machine (Model J120SAII supplied by Nippon Seikosho), and the measurement was conducted at 23° C. according to ASTM G-256.

10) Boiling decane soluble component content

In 100 ml of n-decane at room temperature was mixed 1 g of a sample polymer, and the temperature was elevated with stirring and the slurry solution was boiled over a period of about 30 minutes. In this state, stirring was further conducted for 30 minutes, and at this temperature, the formed gel was promptly filtered. The recovered n-decane solution was completely concentrated to determine the soluble component content.

11) Particle size distribution

About 5 g of a polymer sample was charged in sieves having aperture sizes of 75, 125, 250, 355, 500, 710 and 1180 μm, and classification was conducted for 10 minutes by using a sieving shaker.

12) Transparency (haze)

A sample polymer was molded into a sheet having a size of 80.0 mm×50.0 mm×1.0 mm at a resin temperature of 230° C. by using an injection molding machine (Model J/20SAII supplied by Nippon Seikosho), and after 48 hours, the haze value was measured according to JIS K-6714.

13) Content of polypropylene component

At the differential scanning calorimetry (DSC), melting heats at temperatures of peaks observed within a range of from 155° to 165° C. were measured, and the content of the polypropylene component was determined from the graph showing the relation between the content of the polypropylene component and the melting heat, prepared in advance.

14) Falling time (seconds)

A metal funnel having an outlet having a diameter of 10 mm at the center of the bottom and an upper cylindrical portion having an inner diameter of 68 mm and a height of 60 mm was charged with 100 ml of a sample powder, and the powder was discharged from the funnel while giving lateral vibrations of a width of 2 mm and the time required for discharging all of the powder was measured.

EXAMPLE 1

(Preparation of Titanium Compound)

At 125° C., 0.95 g (10 millimiles) of magnesium hydroxide, 10 ml of decane and 4.7 ml (30 millimoles) of 2-ethylhexyl alcohol were heated and stirred for 2 hours, and 0.55 g (3.75 millimoles) of phthalic anhydride was added and the mixture was further stirred and mixed at 125° C. for 1 hour to form a homogeneous solution. The solution was cooled to room temperature and all of the solution was dropped over a period of 1 hour into 40 ml (0.36 millimole) of titanium tetrachloride maintained at 120° C. Then, the temperature of the liquid mixture was elevated to 110° C. over a period of 2 hours. When the temperature was elevated to 110° C., 0.54 ml (2.5 millimoles) of diisobutyl phthalate was added and at this temperature, the mixture was stirred for 2 hours. After 2 hours' reaction, the solid was recovered by hot filtration and the solid was suspended in 200 ml of TiCl$_4$ again, and the suspension was reacted at 110° C. for 2 hours. After the reaction, the solid was recovered by hot filtration and was sufficiently washed with decane and hexane until the free titanium compound was not detected in the washing liquid. The obtained solid Ti catalyst component was reserved in the form of a heptane slurry. The solid Ti catalyst component comprised 2.1% by weight of titanium, 57% by weight of chlorine, 18.0% by weight of magnesium and 21.9% by weight of diisobutyl phthalate.

(Preliminary Polymerization)

An autoclave having a volume of 1 liter and having the inner atmosphere substituted with N$_2$ was charged with 200 ml of heptane, 50 millimoles of triethyl aluminum, 10 millimoles of diphenyldimethoxysilane, 50 millimoles of ethyl iodide and 5 millimoles, as calculated as the Ti atom, of the solid Ti catalyst component, and propylene was continuously introduced into the reactor in an amount of 5 g per gram of the solid Ti catalyst component over a period of 1 hour to effect first preliminary polymerization. During this preliminary polymerization, the temperature was maintained at 15° C. After 1 hour, introduction of propylene was stopped and the inner atmosphere of the reactor was sufficiently substituted with N$_2$. The solid portion of the obtained slurry was washed with refined heptane six times.

This solid component was charged in an autoclave having an inner volume of 1 liter and having the inner atmosphere substituted with N$_2$, and 200 ml of refined heptane, 50 millimoles of triethyl aluminum, 10 millimoles of 6-triethoxysilyl-2-norbornene and 10 millimoles of ethyl iodided were added and propylene was continuously introduced for 1 hour into the reactor in an amount of 5 g per gram of the solid Ti catalyst component to effect second preliminary polymerization. During this preliminary polymerization, the temperature was maintained at 15° C. The solid portion of the obtained slurry was washed with refined heptane six times to obtain titanium-containing polypropylene.

(Polymerization of 1-Butene)

An autoclave having an inner volume of 2 liters and having the inner atmosphere substituted with N$_2$ was charged with 1000 ml of refined heptane, 50 millimoles of triethyl aluminum, 50 millimoles of diphenyldimethoxysilane and 1.0 millimole, as calculated as the Ti atom, of the titanium-containing polypropylene obtained by the preliminary polymerization, and 1-butene was continuously introduced into the reactor for 1 hour in an amount of 200 g per gram of the titanium-containing polypropylene to effect polymerization of 1-butene. During this polymerization, the temperature was maintained at 20° C. The obtained polymer (hereinafter referred to as titanium-containing polybutene) was washed with refined heptane in an atmosphere of N$_2$ five times. The amount polymerized of 1-butene was 203 g per gram of the titanium-containing polypropylene.

(Copropylene-Ethylene Random Polymerization)

Figure 1:
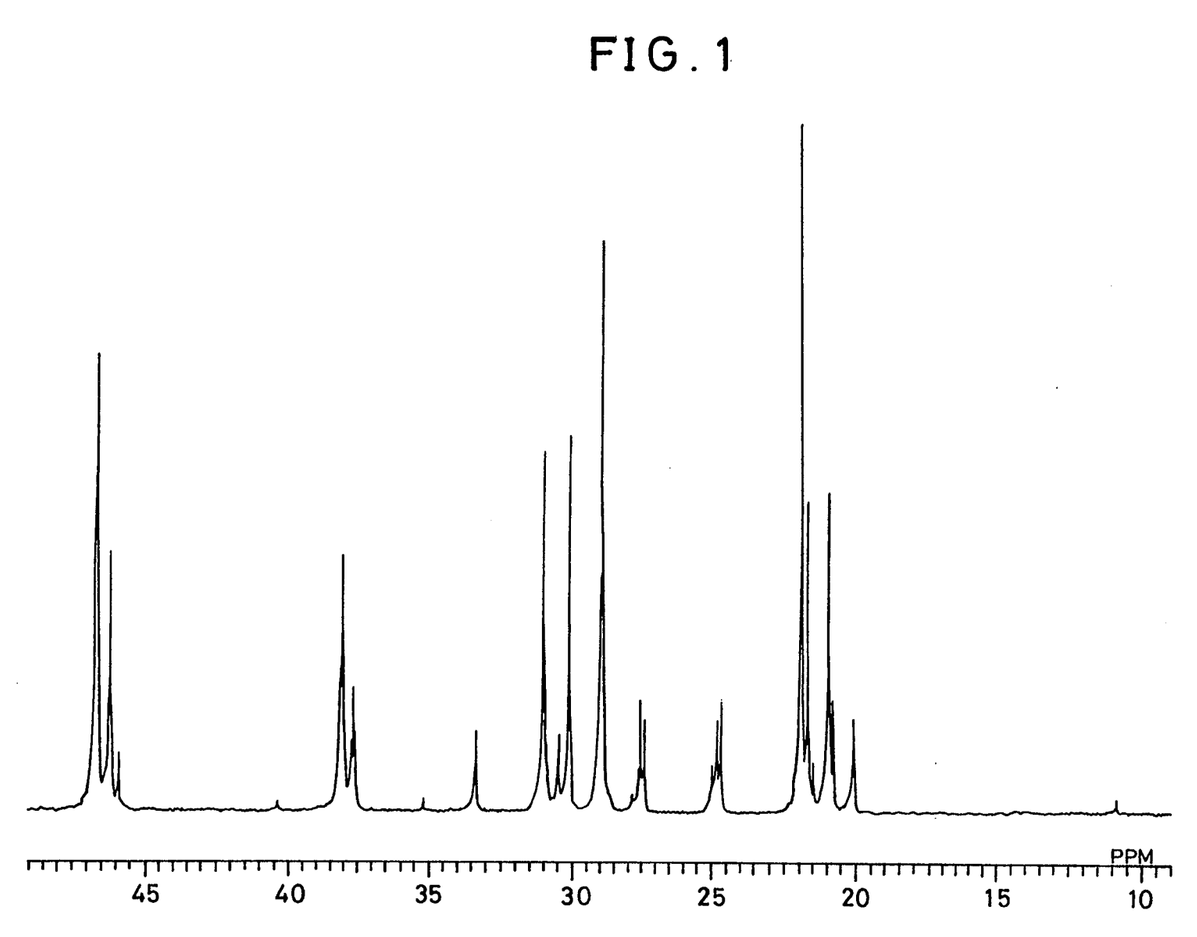
FIG. 1 is the $^{13}$C-nuclear magnetic resonance spectrum chart of the P-E/B block copolymer of the present invention, obtained in Example 1.

An autoclave having an inner volume of 400 liters and having the inner atmosphere substituted with N$_2$ was charged with 200 liters of propylene, and 125 millimoles of triethyl aluminum, 125 millimoles of diphenyldimethoxysilane and ethylene were supplied into the autoclave so that the concentration of the ethylene gas was 18 mole %. The inner temperature of the autoclave was elevated to 50° C. and the titanium-containing polybutene was charged in an amount of 0.5 millimole as calculated as the titanium atom. Then, the inner temperature was elevated to 50° C. and propylene-ethylene random copolymerization was carried out for 1 hour. The polymerization pressure was 26 kg/cm$^2$ and the temperature was maintained at 55° C. during the polymerization. The ethylene concentration was maintained at 18 mole % while checking the concentration by the gas chromatography. After 1 hour's polymerization, a white granular polymer was obtained. Adhesion of the polymer to the interior of the polymerization vessel and the stirring vanes was not observed. The amount obtained of the polymer was 15 kg, and the polymerization activity was 13157 g-polymer/g-titanium component. The $^{13}$C-nuclear magnetic resonance spectrum chart of the obtained P-E/B block copolymer is shown in FIG. 1. The properties of the obtained P-E/B block copolymer are shown in Tables 1 and 2.

EXAMPLES 2 AND 3

The procedures of Example 1 were repeated in the same manner except that in the polymerization of 1-butene, the amount polymerized of 1-butene was changed to 100 g or 500 g per gram of the titanium-containing polypropylene. As the result, 101 g or 520 g of 1-butene was polymerized. The obtained results are shown in Tables 1 and 2.

EXAMPLES 4 AND 5

The procedures of Example 1 were repeated in the same manner except that the ethylene gas concentration was changed to 26 mole % or 12 mole % in the ethylene-propylene copolymerization. The obtained results are shown in Tables 1 and 2.

EXAMPLES 6 AND 7

The procedures of Example 1 were repeated in the same manner except that the hydrogen gas concentration was changed to 0.01 mole % (Example 6) or 0.02 mole % (Example 7) in the propylene-ethylene copolymerization. The obtained results are shown in Tables 1 and 2.

EXAMPLES 8 AND 10

The procedures of Example 1 were repeated in the same manner except that in the second preliminary polymerization, phenyltriethoxysilane (Example 8), methylphenyldiethoxysilane (Example 9) or butyltriethoxysilane (Example 10) was used as the organic silicon compound instead of 6-triethoxysilyl-2-norbornene. The obtained results are shown in Tables 1 and 2.

EXAMPLE 11

(Preparation of Titanium Compound)

Reaction was carried out by pulverizing 100 g of aluminum trichloride (anhydride) and 29 g of magnesium hydroxide at 250° C. by a shaking mill for 3 hours. After the heating, the pulverized product was cooled in a nitrogen current to obtain a solid product (SP-I).

In a glass flask, 15 ml of refined decane, 2.5 g of the solid product (SP-I), 8.5 g of n-butyl o-titanate and 9.8 g of 2-ethyl-1-hexanol were mixed, and the mixture was heated at 130° C. for 1.5 hours to form a homogeneous solution. The temperature of the solution was adjusted to 70° C. and 1.8 g of ethyl p-toluylate was added to the solution, and the reaction was carried out for 1 hour. Then, 26 g of silicon tetrachloride was dropped into the reaction mixture with stirring over a period of 2 hours to precipitate a solid, and the mixture was stirred at 70° C. for 1 hour. The solid was recovered from the solution and washed with refined hexane to obtain a solid product (SP-II).

Then, 1.5 g of diisobutyl phthalate, together with 30 ml of 1,2-dichloroethane and 30 ml of titanium tetrachloride, was added to all of the solid product (SP-II), and reaction was carried out at 100° C. for 2 hours with stirring. At the same temperature, the liquid phase portion was removed by decantation, and 30 ml of 1,2-dichloroethane, 30 ml of titanium tetrachloride and 1.5 g of diisobutyl phthalate were added to the residue and reaction was carried out at 100° C. for 2 hours with stirring. The solid portion was collected by hot filtration, washed with refined hexane and dried at 25° C. under a reduced pressure for 1 hour to obtain a solid product (SP-III).

The solid product (SP-III) had a spherical shape and the average particle size was 15 μm, and the particle size distribution was very narrow. The solid product (SP-III) was used as the solid Ti catalyst component.

From the results of the analysis, it was confirmed that the solid Ti catalyst component comprised 3.0% by weight (all of "%" given below being by weight), 56.2% of Cl, 17.6% of Mg, 1.7% of Al, 20.1% of diisobutyl phthalate, 1.1% of the butoxy group, 0.2% of the 2-ethylhexyl group and 0.1% of ethyl p-toluylate.

The preliminary polymerization and the main polymerization were conducted in the same manner as described in Example 1. The obtained results are shown in Tables 1 and 2.

EXAMPLE 12

(Preparation of Titanium Compound)

A 500-ml three-neck glass flask having the inner atmosphere substituted with nitrogen and being equipped with a thermometer and a stirrer was charged with 50 ml of refined heptane, 50 ml of titanium tetrabutoxide and 7.0 g of anhydrous magnesium chloride. Then, the temperature of the flask was elevated to 90° C. and the magnesium chloride was completely dissolved over a period of 2 hours. Then, the flask was cooled to 40° C. and 10 ml of methylhydrodiene polysiloxane was added to the solution to precipitate a magnesium chloride-titanium tetrabutoxide complex. The complex was washed with refined heptane to obtain a grayish white solid.

Then, 50 ml of a heptane slurry containing 10 g of the obtained precipitate solid was introduced into a three-neck glass flask having an inner volume of 300 ml and having the inner atmosphere substituted with nitrogen (equipped with a thermometer and a stirrer). Then, 20 ml of a heptane solution containing 5.8 ml of silicon tetrachloride was added to the slurry at room temperature over a period of 30 minutes and the reaction was carried out at 30° C. for 45 minutes. The reaction was further conducted at 90° C. for 1.5 hours, and then, the reaction product was washed with refined heptane. Then, 50 ml of a heptane solution containing 1.5 ml of diheptyl phthalate was added to the product and reaction was carried out at 50° C. for 2 hours. Then, the reaction product was washed with refined heptane and 25 ml of titanium tetrachloride was added to the reaction product, and reaction was carried out at 90° C. for 2 hours. The reaction product was washed with refined heptane to obtain a solid Ti catalyst component. The titanium content in the solid catalyst component was 30.4% by weight.

The preliminary polymerization and main polymerization were then carried out in the same manner as described in Example 1. The obtained results are shown in Tables 1 and 2.

EXAMPLE 13

The procedures of Example 8 were repeated in the same manner except that vinyltriethoxysilane was used instead of phenyltriethoxysilane. The obtained results are shown in Tables 1 and 2.

EXAMPLE 14

The procedures of Example 8 were repeated in the same manner except that cyclohexyltriethoxysilane was used instead of phenyltriethoxysilane. The obtained results are shown in Tables 1 and 2.

EXAMPLE 15

The procedures of Example 1 were repeated in the same manner except that iodine was used instead of methyl iodide in the first preliminary polymerization and the second preliminary polymerization. The obtained results are shown in Tables 1 and 2.

EXAMPLE 16

The procedures of Example 1 were repeated in the same manner except that the ethylene gas concentration was changed to 33 mole %. The obtained results are shown in Tables 1 and 2.

COMPARATIVE EXAMPLES 1 THROUGH 3

The procedures of Example 1 were repeated in the same manner except that the polymerization of 1-butene was not carried out (Comparative Example 1), or 1-butene was polymerized in an amount of 5 g (Comparative Example 2) or 2000 g (Comparative Example 3) per gram of the titanium-containing polypropylene obtained by the preliminary polymerization. The amount polymerized of 1-butene was 5.0 g (Comparative Example 2) or 2400 g (Comparative Example 3) per gram of the titanium-containing polypropylene. The obtained results are shown in Tables 3 and 4.

COMPARATIVE EXAMPLES 4 AND 5

The procedures of Example 1 were repeated in the same manner except that in the propylene-ethylene copolymerization, the hydrogen gas was introduced so that the gas concentration was 0.08 mole % or 0.12 mole %. The obtained polymer was not powdery. The obtained results are shown in Tables 3 and 4.

COMPARATIVE EXAMPLES 6 THROUGH 8

The procedures of Example 1 were repeated in the same manner except that propylene (Comparative Example 6), propylene (Comparative Example 7) or ethylene (Comparative Example 8) was polymerized in an amount of 200 g, 500 g or 200 g, respectively, per gram of the titanium-containing polypropylene obtained by the preliminary polymerization. As the result, the amount polymerized of propylene was 203 g (Comparative Example 6) or 520 g (Comparative Example 7) or the amount polymerized of ethylene was 203 g (Comparative Example 8), per gram of the titanium-containing polypropylene. The obtained results are shown in Tables 3 and 4.

COMPARATIVE EXAMPLE 9

The procedures of Example 1 were repeated in the same manner except that in the propylene-ethylene copolymerization, ethylene was supplied so that the ethylene concentration was 5 mole %. The ethylene content in the obtained block copolymer was too low and the physical properties were insufficient. The obtained results are shown in Tables 3 and 4.

COMPARATIVE EXAMPLE 10

The procedures of Example 1 were repeated in the same manner except that the order of the polymerization of 1-butene and the propylene-ethylene copolymerization was reversed. Namely, after the preliminary polymerization, the propylene-ethylene random copolymerization was first conducted, and then, the polymerization of 1-butene was carried out. The obtained results are shown in Tables 3 and 4.

COMPARATIVE EXAMPLES 11 THROUGH 13

The physical properties of a mixture of 100 parts by weight of the propylene-ethylene random copolymer obtained in Example 1 and 0.5 part by weight, 1 part by weight or 5 parts by weight of polybutene-1 (M8010 supplied by Mitsui Petrochemical) were measured. The obtained results are shown in Table 5.

EXAMPLES 17 AND 18

The procedures of Example 1 were repeated in the same manner except that the following polymerization of propylene was conducted between the polymerization of 1-butene and the propylene-ethylene random copolymerization.

Namely, after the polymerization of 1-butene was carried out in the same manner as described in Example 1, an autoclave having an inner volume of 400 liters and having the inner atmosphere substituted with $N_2$ was charged with 200 l of propylene, 125 millimoles of triethyl aluminum and 125 millimoles of diphenyldimethoxysilane, and the inner temperature of the autoclave was elevated to 70° C. and 0.5 millimole of the titanium-containing polybutene was charged in an amount of 0.5 millimole as calculated as the titanium atom. Polymerization of propylene was conducted at 70° C. for 20 minutes (Example 17) or for 45 minutes (Example 18). The inner temperature of the autoclave was abruptly lowered to 55° C., and simultaneously, ethylene was supplied so that the gas concentration was 20 mole % and the propylene-ethylene random copolymerization was carried out for 60 minutes. During the copolymerization, the temperature was maintained at 55° C. and the ethylene gas concentration was maintained at 24 mole % while checking the concentration by the gas chromatography. After the random copolymerization, the unreacted monomers were purged and a white granular polymer was obtained. Adhesion of the polymer to the interior of the polymerization vessel or stirring vanes was not observed at all. The amount formed of the polymer was 16.3 kg (Example 17) or 18.1 kg (Example 18), and the polymerization activity was 14300 g-polymer/g-catalyst (Example 17) or 15880 g-polymer/g-catalyst.

Separately, only the above-mentioned polymerization of propylene was carried out, and the polymerization activity was 1100 g-polymer/g-titanium compound at 70° C. for 20 minutes or 2600 g-polymer/g-titanium compound at 70° C. for 45 minutes.

Accordingly, it is seen that the content of the polypropylene component in the obtained block copolymer was 7.7% by weight (Example 17) or 16.4% by weight (Example 18).

Figure 2:
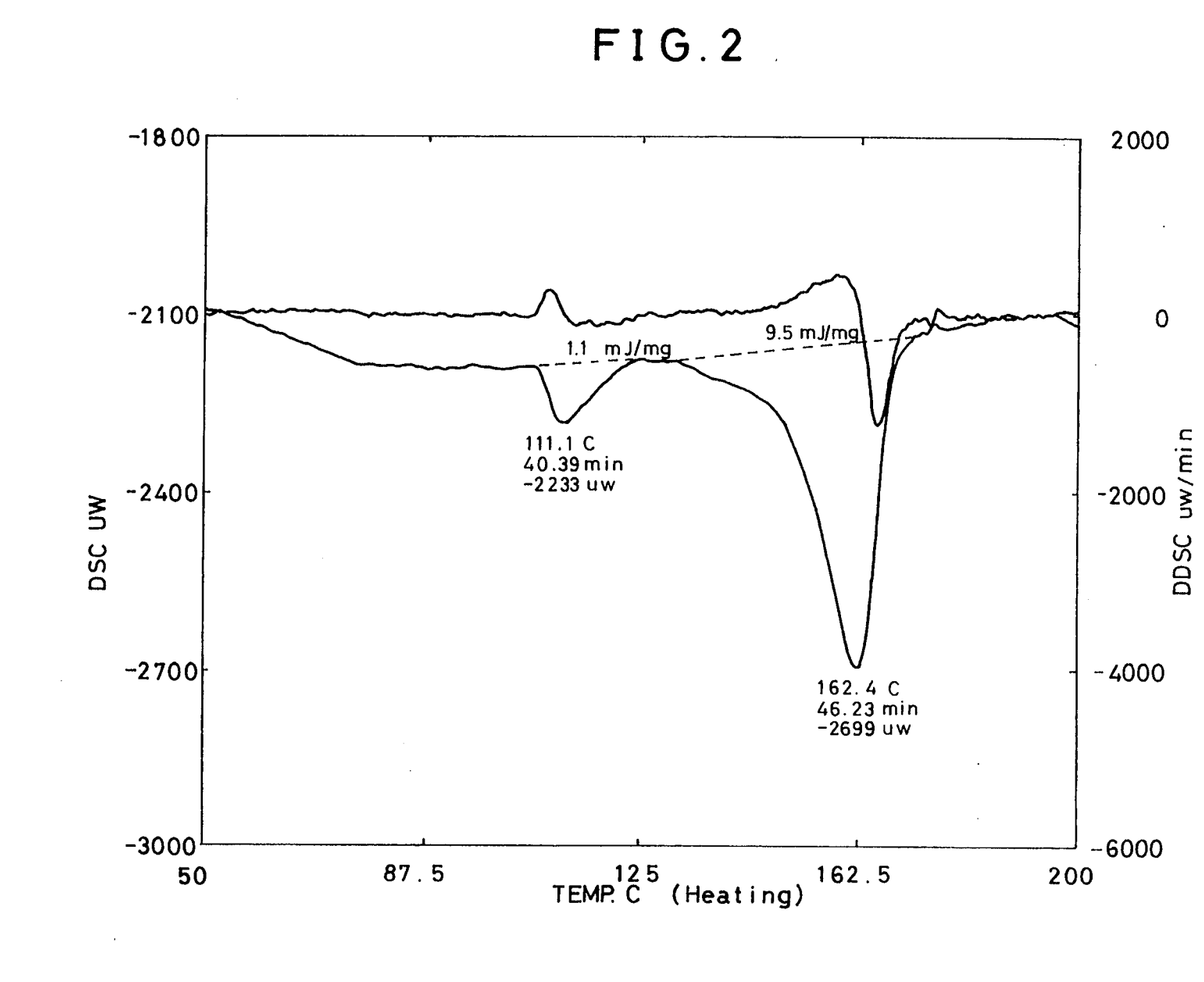
FIG. 2 is the DSC chart of the P-E/B block copolymer of the present invention, obtained in Example 17.

The DSC chart of the P-E/B block copolymer obtained in Example 17 is shown in FIG. 2.

The obtained results are shown in Tables 6 and 7.

EXAMPLE 19

The procedures of Example 18 were repeated in the same manner except that in the propylene-ethylene random copolymerization, the hydrogen gas concentration was changed to 0.06 mole %. The amount formed of the polymer was 19.8 kg, and the polymerization activity was 17400 g-polymer/g-catalyst. Accordingly, it is seen that the content of the polypropylene component in the block copolymer was 14.9% by weight.

The obtained results are shown in Tables 6 and 7.

EXAMPLE 20

(Preliminary Polymerization)

A glass autoclave reactor having an inner volume of 1 liter and provided with a stirrer, the inner atmosphere of which was sufficiently substituted with nitrogen gas, was charged with 400 ml of heptane, and while maintaining the inner temperature of the reactor at 20° C., 14.5 millimoles of diethylaluminum chloride and 18.1 millimoles of titanium trichloride ("TOS-17" supplied by Marubeni-Solvay) were added into the reactor and propylene was continuously introduced into reactor and propylene was continuously introduced into the reactor for 1 hour so that the amount of propylene was 3 g per gram of the catalyst. During this introduction, the temperature was maintained at 20° C. The introduction of propylene was stopped and the inner atmosphere of the reactor was sufficiently substituted with nitrogen gas, and the obtained titanium-containing polypropylene was washed with refined heptane four times. As the result of the analysis, it was found that 2.9 g of propylene was polymerized per gram of the catalyst.

(Main Polymerization)

Step 1: Polymerization of 1-Butene

The inner atmosphere of a stainless steel autoclave reactor provided with a stirrer and having an inner volume of 2 liters was sufficiently substituted with nitrogen gas, and 1000 ml of heptane was charged into the reactor. While maintaining the inner temperature of the reactor at 20° C., 0.70 millimole of diethylaluminum chloride and 0.087 millimole, as titanium trichloride, of the titanium-containing polypropylene obtained by the preliminary polymerization were added into the reactor and 1-butene was continuously introduced into the reactor for 2 hours in an amount of 30 g per gram of the catalyst. During the introduction, the temperature was maintained at 20° C. Supply of 1-butene was stopped and the inner atmosphere of the reactor was substituted with nitrogen gas, and the titanium-containing poly-1-butene was recovered. The obtained poly-1-butene was washed with refined heptane two times in a nitrogen atmosphere. As the result of the analysis, it was found that 1-butene was polymerized in an amount of 28 g per gram of the titanium compound.

Step 2: Polymerization of Propylene and C Copolymerization of Propylene and Ethylene An autoclave having the inner atmosphere substituted with $N_2$ was charged with 1 l of propylene and 0.70 millimole of diethylaluminum chloride, and the inner temperature of the autoclave was elevated to 70°

C. The titanium-containing poly-1-butene was added into the autoclave in an amount of 0.087 millimole as titanium trichloride, and polymerization of propylene was carried out at 70° C. for 30 minutes. Then, the inner temperature of the autoclave was abruptly lowered to 55° C., and simultaneously, 0.35 millimole of ethylaluminum diethoxide was added into the autoclave and ethylene was supplied so that the ethylene gas concentration was 7 mole %. The propylene-ethylene copolymerization was carried out at 55° C. for 90 minutes. During this copolymerization, the ethylene gas concentration was maintained at 10 mole % while checking the gas concentration by the gas chromatography. After the copolymerization, the unreacted monomers were purged and a white granular polymer was obtained. Adhesion of the polymer to the interior of the polymerization vessel or stirring vanes was not observed at all. The amount formed of the polymer was 110 g and the polymerization activity was 5730 g-polymer/g-catalyst.

Separately, only the polymerization of propylene was conducted at 70° C. for 30 minutes. Propylene was polymerized in an amount of 340 g per gram of the titanium compound. Accordingly, it was confirmed that the content of the polypropylene component in the block copolymer was 5.9% by weight.

The obtained results are shown in Tables 6 and 7.

COMPARATIVE EXAMPLE 14

The procedures of Example 17 were repeated in the same manner except that the polymerization of propylene was conducted at 70° C. for 60 minutes and the ethylene-propylene copolymerization was carried out at 55° C. for 30 minutes. The amount formed of the polymer was 9.2 kg and the polymerization activity was 8100 g-polymer/g-catalyst.

Separately, propylene was polymerized at 70° C. for 60 minutes. The polymerization activity was 3200 g-polymer/g-titanium compound. Accordingly, it was found that the content of the polypropylene component in the block copolymer was 39.5% by weight.

The obtained copolymer was inferior in the softness. The obtained results are shown in Tables 6 and 7.

TABLE 1

Properties of Powdery P-E/B Copolymer

| Example No. | polymerization activity (g-pp/g-cat) | content (% by weight) of poly-butene | ethylene content (mole %) | weight average molecular weight ($\times 10^4$) | bulk density (g/cm$^3$) | repose angle (degrees) | GPC content (% by weight) of portion having molecular weight lower than $10^4$ | boiling decalin soluble component content (%) | particle size distribution | | | falling time (sec.) |
|---|---|---|---|---|---|---|---|---|---|---|---|---|
| | | | | | | | | | $D_{50}$ | greater than 100 μm (% by weight) | less than 1000 μm (% by weight) | |
| 1 | 13175 | 1.54 | 24 | 190 | 0.45 | 33.5 | 0.3 | 100 | 470 | <0.5 | <0.2 | 14 |
| 2 | 14200 | 0.71 | 24 | 190 | 0.46 | 33.0 | 0.3 | 100 | 484 | <0.5 | <0.2 | 13 |
| 3 | 12150 | 4.29 | 24 | 185 | 0.41 | 39.0 | 0.4 | 100 | 480 | <0.5 | <0.2 | 19 |
| 4 | 16320 | 1.24 | 36 | 210 | 0.41 | 38.5 | 0.4 | 100 | 511 | <0.5 | <0.2 | 18 |
| 5 | 12250 | 1.66 | 21 | 175 | 0.49 | 32.0 | 0.3 | 100 | 460 | <0.5 | <0.2 | 12 |
| 6 | 14400 | 1.41 | 23 | 160 | 0.44 | 33.5 | 0.3 | 100 | 480 | <0.5 | <0.2 | 14 |
| 7 | 15150 | 1.34 | 23 | 150 | 0.43 | 34.0 | 0.3 | 100 | 499 | <0.5 | <0.2 | 15 |
| 8 | 13400 | 1.52 | 24 | 190 | 0.44 | 33.5 | 0.4 | 100 | 468 | <0.5 | <0.2 | 14 |
| 9 | 12900 | 1.57 | 24 | 190 | 0.44 | 33.5 | 0.3 | 100 | 465 | <0.5 | <0.2 | 14 |
| 10 | 12200 | 1.67 | 24 | 190 | 0.43 | 34.0 | 0.3 | 100 | 454 | <0.5 | <0.2 | 14 |
| 11 | 14950 | 1.36 | 24 | 180 | 0.43 | 34.0 | 0.4 | 100 | 440 | <0.5 | <0.2 | 14 |
| 12 | 14100 | 1.44 | 24 | 185 | 0.43 | 34.0 | 0.4 | 100 | 420 | <0.5 | <0.2 | 14 |
| 13 | 12900 | 1.55 | 24 | 190 | 0.44 | 34.0 | 0.4 | 100 | 464 | <0.5 | <0.2 | 14 |
| 14 | 13300 | 1.50 | 24 | 190 | 0.43 | 33.5 | 0.4 | 100 | 469 | <0.5 | <0.2 | 14 |
| 15 | 13100 | 1.53 | 24 | 190 | 0.45 | 33.5 | 0.3 | 100 | 467 | <0.5 | <0.2 | 13 |
| 16 | 18400 | 1.09 | 52 | 230 | 0.40 | 39.0 | 0.4 | 100 | 520 | <0.5 | <0.2 | 19 |

TABLE 2

| | Properties of Press-Molded Article | | | | Properties of Injection-Molded Article | | | |
|---|---|---|---|---|---|---|---|---|
| Example No. | Shore A hardness | tensile strength at break (kg/cm$^2$) | elongation (%) | softening temperature (°C.) | flexural modulus (kg/cm$^2$) | Izod impact strength (kg·cm/cm$^2$) | | transparency (haze) (%) |
| | | | | | | +23° C. | −20° C. | |
| 1 | 93 | 190 | 700 | 131 | 2500 | not broken | not broken | 46 |
| 2 | 93 | 195 | 670 | 132 | 2500 | not broken | not broken | 48 |
| 3 | 90 | 185 | 750 | 130 | 2400 | not broken | not broken | 44 |
| 4 | 75 | 140 | 800 | 99 | 600 | not broken | not broken | 46 |
| 5 | 97 | 220 | 600 | 136 | 3200 | not broken | not broken | 47 |
| 6 | 94 | 170 | 700 | 131 | 2400 | not broken | not broken | 46 |
| 7 | 94 | 160 | 700 | 131 | 2200 | not broken | not broken | 46 |
| 8 | 93 | 190 | 700 | 131 | 2400 | not broken | not broken | 46 |
| 9 | 93 | 190 | 700 | 131 | 2400 | not broken | not broken | 46 |
| 10 | 93 | 185 | 700 | 131 | 2400 | not broken | not broken | 46 |
| 11 | 93 | 185 | 700 | 130 | 2400 | not | not | 47 |

TABLE 2-continued

| | | Properties of Press-Molded Article | | | Properties of Injection-Molded Article | | | |
|---|---|---|---|---|---|---|---|---|
| Example No. | Shore A hardness | tensile strength at break (kg/cm$^2$) | elongation (%) | softening temperature (°C.) | flexural modulus (kg/cm$^2$) | Izod impact strength (kg · cm/cm$^2$) | | transparency (haze) (%) |
| | | | | | | +23° C. | −20° C. | |
| 12 | 93 | 190 | 700 | 130 | 2400 | broken not broken | broken not broken | 47 |
| 13 | 93 | 190 | 700 | 131 | 2400 | not broken | not broken | 46 |
| 14 | 93 | 190 | 700 | 131 | 2400 | not broken | not broken | 46 |
| 15 | 94 | 195 | 700 | 131 | 2400 | not broken | not broken | 46 |
| 16 | 70 | 125 | 800 | 95 | 450 | not broken | not broken | 47 |

TABLE 3

| | Properties of Powdery P-E/B Copolymer | | | | | | | | | | |
|---|---|---|---|---|---|---|---|---|---|---|---|
| Comparative Example No. | polymerization activity (g-pp/g-cat) | content (% by weight) of polybutene | ethylene content (mole %) | weight average molecular weight (× 10$^4$) | bulk density (g/cm$^3$) | repose angle (degrees) | GPC content (% by weight) of portion having molecular weight lower than 10$^4$ | boiling decalin soluble component content (%) | particle size distribution | | falling time (sec.) |
| | | | | | | | | | D$_{50}$ | greater than 100 μm (% by weight) | less than 1000 μm (% by weight) |
| 1 | 13200 | — | 24 | 190 | 0.45 | 33.0 | 0.3 | 100 | 470 | <0.5 | <0.2 | 15 |
| 2 | 12900 | 0.04 | 24 | 190 | 0.45 | 33.0 | 0.3 | 100 | 468 | <0.5 | <0.2 | 14 |
| 3 | 11000 | 22.2 | 25 | 190 | 0.27 | measurement impossible | 1.2 | 100 | measurement impossibl because of agglomeration of particles | | | measurement impossible |
| 4 | 16500 | 1.23 | 23 | 80 | 0.24 | measurement impossible | 1.4 | 100 | measurement impossible because of agglomeration of particles | | | measurement impossible |
| 5 | 17700 | 1.14 | 21 | 65 | 0.26 | measurement impossible | 1.7 | 100 | measurement impossible because of agglomeration of particles | | | measurement impossible |
| 6 | 14200 | polypropylene 1.43 | 24 | 190 | 0.41 | 35.0 | 0.4 | 100 | 470 | <0.5 | <0.2 | 19 |
| 7 | 15000 | polypropylene 3.45 | 24 | 190 | 0.44 | 33.5 | 0.4 | 100 | 488 | <0.5 | <0.2 | 15 |
| 8 | 14600 | polyethylene 1.39 | 24 | 190 | 0.34 | 42.5 | 0.5 | 100 | 484 | <0.5 | <0.2 | 32 |
| 9 | 11200 | polybutene 1.79 | 7 | 170 | 0.45 | 33.0 | 0.3 | 100 | 460 | <0.5 | <0.2 | 12 |
| 10 | 13600 | polybutene 1.44 | 24 | 90 | 0.27 | measurement impossible | 1.6 | 100 | measurement impossible because of agglomeration of particles | | | measurement impossible |

TABLE 4

| | | Properties of Press-Molded Article | | | Properties of Injection-Molded Article | | | |
|---|---|---|---|---|---|---|---|---|
| Comparative Example No. | Shore A hardness | tensile strength at break (kg/cm$^2$) | elongation (%) | softening temperature (°C.) | flexural modulus (kg/cm$^2$) | Izod impact strength (kg · cm/cm$^2$) | | transparency (haze) (%) |
| | | | | | | +23° C. | −20° C. | |
| 1 | 93 | 190 | 700 | 132 | 2500 | not broken | not broken | 64 |
| 2 | 93 | 190 | 700 | 132 | 2500 | not broken | not broken | 62 |
| 3 | 90 | 155 | 750 | 124 | measurement imposoible because of hanging in hopper of molding machine and insufficient biting by screw | | | |
| 4 | 90 | 125 | 700 | 122 | measurement imposoible because of hanging in | | | |

TABLE 4-continued

| | Properties of Press-Molded Article | | | | Properties of Injection-Molded Article | | | |
|---|---|---|---|---|---|---|---|---|
| Comparative Example No. | Shore A hardness | tensile strength at break (kg/cm²) | elongation (%) | softening temperature (°C.) | flexural modulus (kg/cm²) | Izod impact strength (kg · cm/cm²) +23° C. | −20° C. | transparency (haze) (%) |
| 5 | 87 | 110 | 700 | 120 | \multicolumn{4}{l}{hopper of molding machine and insufficient biting by screw measurement imposoible because of hanging in hopper of molding machine and insufficient biting by screw} |
| 6 | 95 | 195 | 700 | 133 | 2500 | not broken | not broken | 64 |
| 7 | 95 | 195 | 700 | 134 | 2600 | not broken | not broken | 67 |
| 8 | 93 | 190 | 700 | 131 | 2400 | not broken | not broken | 63 |
| 9 | 99 | 240 | 550 | 141 | 4900 | not broken | 11 | 46 |
| 10 | 93 | 190 | 700 | 129 | \multicolumn{4}{l}{measurement imposoible because of hanging in hopper of molding machine and insufficient biting by screw} |

TABLE 5

| Comparative Example No. | Amount (% by weight) of Added Polybutene | Shore A Hardness | Transparency (haze) (%) |
|---|---|---|---|
| 11 | 0.5 | 93 | 64 |
| 12 | 1.0 | 91 | 64 |
| 13 | 5.0 | 88 | 64 |

TABLE 6

| | | | | | | | GPC content (% by weight) | boiling decalin soluble | particle size distribution | | | |
|---|---|---|---|---|---|---|---|---|---|---|---|---|
| Example No. | polymerization activity (g-pp/g-cat) | content (% by weight) of polybutene | ethylene content (mole %) | weight average molecular weight (× 10⁴) | bulk density (g/cm³) | repose angle (degrees) | of portion having molecular weight lower than 10⁴ | component content (%) | D₅₀ | greater than 100 μm (% by weight) | less than 1000 μm (% by weight) | falling time (sec.) |
| 17 | 14300 | 1.42 | 25 | 185 | 0.46 | 33.0 | 0.3 | 100 | 480 | <0.5 | <0.2 | 9 |
| 18 | 15880 | 1.28 | 23 | 185 | 0.46 | 33.0 | 0.3 | 100 | 498 | <0.5 | <0.2 | 8 |
| 19 | 17400 | 1.17 | 25 | 95 | 0.41 | 38.5 | 0.4 | 100 | 520 | <0.5 | <0.2 | 18 |
| 20 | 5730 | 0.49 | 26 | 220 | 0.44 | 33.0 | 0.1 | 100 | 430 | <0.5 | <0.2 | 9 |
| Comparative Example 14 | 8100 | 2.51 | 17 | 170 | 0.46 | 32.0 | 0.3 | 100 | 390 | <0.5 | <0.2 | 8 |

TABLE 7

| | Properties of Press-Molded Article | | | | Properties of Injection-Molded Article | | | |
|---|---|---|---|---|---|---|---|---|
| Example No. | Shore A hardness | tensile strength at break (kg/cm²) | elongation (%) | softening temperature (°C.) | flexural modulus (kg/cm²) | Izod impact strength (kg · cm/cm²) +23° C. | −20° C. | transparency (haze) (%) |
| 17 | 92 | 205 | 700 | 136 | 2400 | not broken | not broken | 47 |
| 18 | 93 | 215 | 650 | 139 | 2600 | not broken | not broken | 49 |
| 19 | 90 | 175 | 700 | 135 | 2300 | not broken | not broken | 46 |
| 20 | 88 | 195 | 700 | 133 | 2000 | not broken | not broken | 42 |
| Comparative Example 14 | >99 | 245 | 320 | 144 | 6200 | not broken | 22 | 71 |

We claim:

1. A powdery propylene-ethylene/butene block copolymer thermoplastic elastomer, comprising (i) a butene polymer block composed of a butene homopolymer or a copolymer of butene and up to 5 mole % of an alpha-olefin other than butene, (ii) a propylene-ethylene random copolymer block and (iii) a propylene polymer block composed of a propylene homopolymer or a copolymer of propylene and up to 5 mol % of an alpha-olefin other than propylene, the content of the butene polymer block (i) being 0.1 to 10% by weight, the total content of the propylene-ethylene random copolymer block and the propylene polymer block being 99.9 to 90% by weight and the content of the propylene polymer block being 0 to 30% by weight, wherein the propylene-ethylene random copolymer block is composed of a copolymer comprising 15 to 80 mol % of ethylene and 85 to 20 mol % of propylene, and said block copolymer is a thermoplastic elastomer which is a powder having a high molecular weight and a bulk density of at least 0.35 g/cm³ and wherein the proportion of said block copolymer having a molecular weight below 10,000 is less than 1% by weight.

2. A propylene-ethylene/butene block copolymer as set forth in claim 1, wherein the propylene-ethylene/butene block copolymer has a bulk density of 0.35 g/cm³ to 0.50 g/cm³.

3. A propylene-ethylene/butene block copolymer as set forth in claim 1, wherein the weight average molecular weight of the propylene-ethylene/butene block copolymer is at least 800,000.

4. A propylene-ethylene/butene block copolymer as set forth in claim 1, wherein the propylene-ethylene/butene block copolymer has a weight average molecular weight of at least 1,000,000.

5. A propylene-ethylene/butene block copolymer as set forth in claim 1, wherein the propylene-ethylene random copolymer component is a random copolymer comprising 15 to 60 mole % of monomer units based on ethylene and 85 to 40 mole % of monomer units based on propylene.

6. The propylene-ethylene/butene block copolymer according to claim 1, wherein said propylene-ethylene/butene block copolymer has a weight average molecular weight of at least 600,000.

7. The propylene-ethylene/butene block copolymer according to claim 1, wherein said propylene-ethylene/butene block copolymer has an average particle diameter ($D_{50}$) of 100 to 1,000 μm.

8. The propylene-ethylene/butene block copolymer according to claim 1, wherein the content of particles having a size smaller than 100 μm is less than 1% by weight and the content of particles having a size of at least 1,000 μm is less than 1% by weight.

9. The propylene-ethylene/butene block copolymer according to claim 1, having an angle of repose of less than 40°.

10. The propylene-ethylene/butene block copolymer according to claim 1, wherein the weight average molecular weight of the block copolymer is from about 1,500,000 to about 3,000,000.

11. A propylene-ethylene/propylene/butene block copolymer comprising (i) a butene polymer block composed of a butene homopolymer or a copolymer of butene and up to 5 mole % of an α-olefin other than butene, (ii) a propylene-ethylene random copolymer block and (iii) a propylene polymer block composed of a propylene homopolymer or a copolymer of propylene and up to 5 mole % of an α-olefin other than propylene, the content of the butene polymer block (i) being 0.1 to 10% by weight, the total content of the propylene-ethylene random copolymer block (ii) and the propylene polymer block (iii) being 99.9 to 90% by weight and the content of the propylene polymer block (iii) being 0.001 to 30% by weight, wherein the propylene-ethylene random copolymer block is composed of a copolymer comprising 15 to 80 mole % of ethylene and 85 to 20 mole % of propylene and said block copolymer is a thermoplastic elastomer which is a powder having a high molecular weight and having a bulk density of at least 0.35 g/cm³ and wherein the proportion of said block copolymer having a molecular weight below 10,000 is less than 1% by weight.

12. The propylene-ethylene/propylene/butene block copolymer according to claim 11, wherein said block copolymer has a peak in a range of 155° to 165° C. measured by differential scanning calorimetry (DSC).

* * * * *